No. 650,558. Patented May 29, 1900.
T. B. HATCH.
PROPELLING MECHANISM FOR BOATS.
(Application filed May 18, 1899.)
(No Model.) 3 Sheets—Sheet 1.
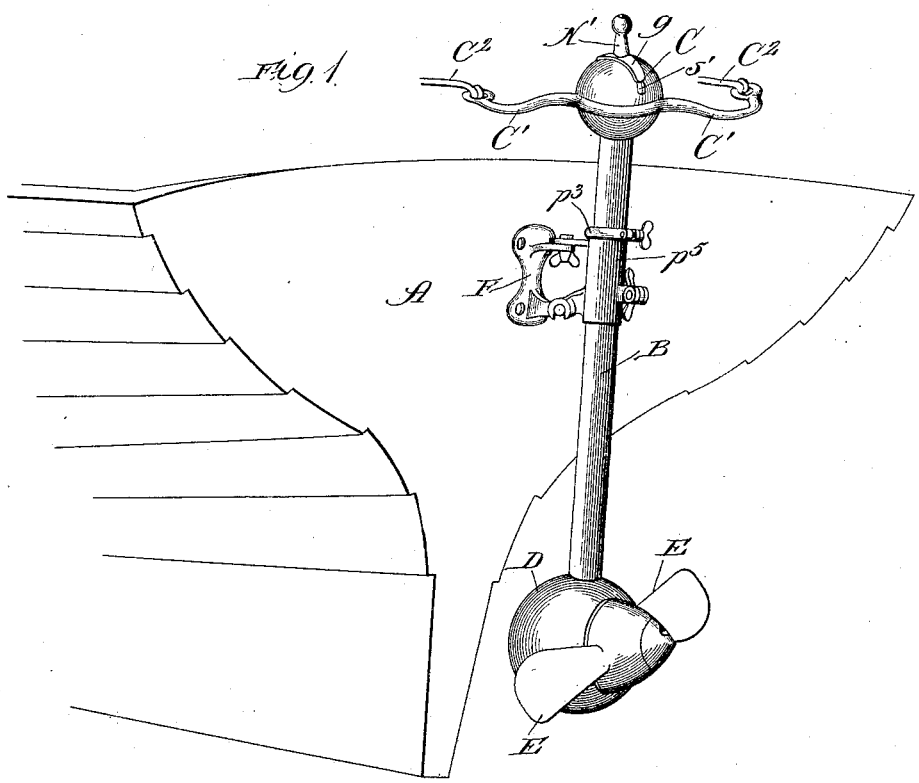
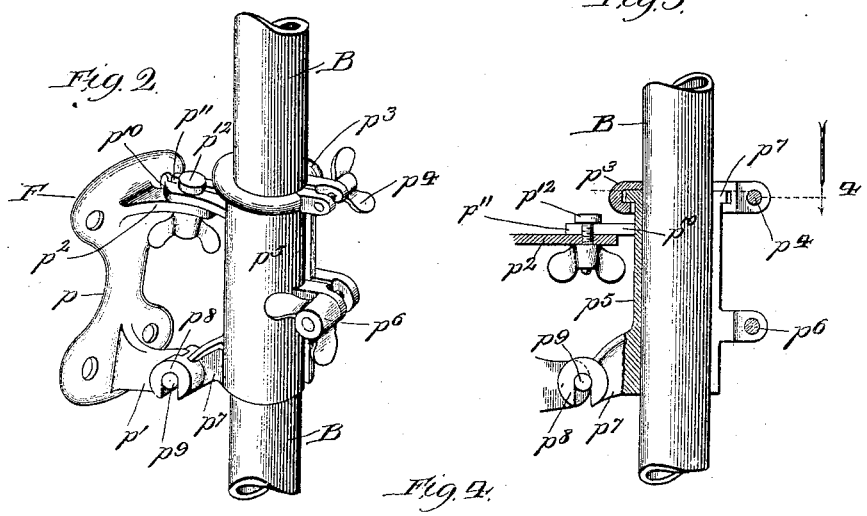
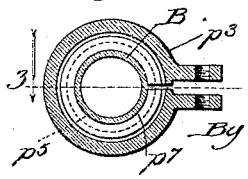
Witnesses:
Inventor:
Tracy B. Hatch,
By Dyrenforth & Dyrenforth,
Attys.

No. 650,558. Patented May 29, 1900.
T. B. HATCH.
PROPELLING MECHANISM FOR BOATS.
(Application filed May 18, 1899.)
(No Model.) 3 Sheets—Sheet 2.
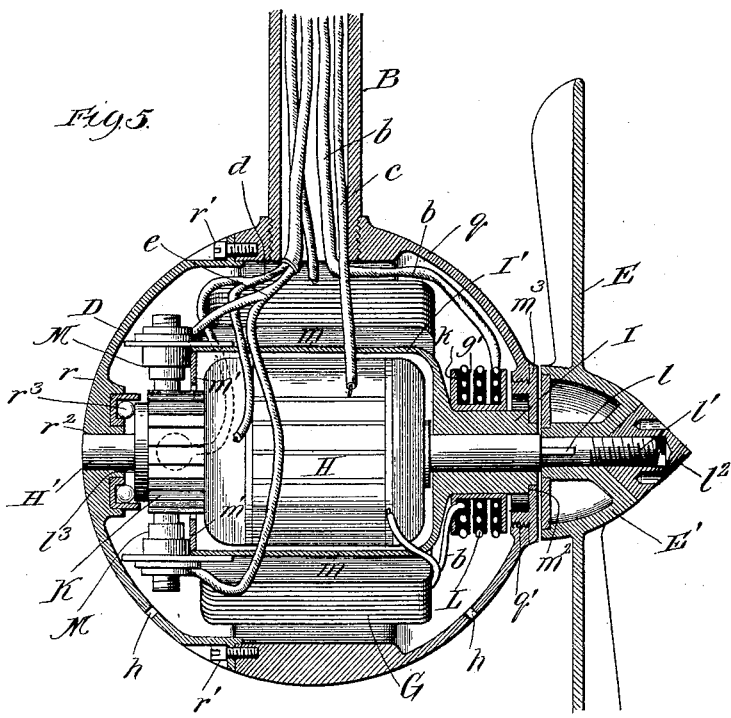
Witnesses:
Inventor:
Tracy B. Hatch,
By Dyrenforth & Dyrenforth,
Attys.

No. 650,558. Patented May 29, 1900.
T. B. HATCH.
PROPELLING MECHANISM FOR BOATS.
(Application filed May 18, 1899.)
(No Model.) 3 Sheets—Sheet 3.
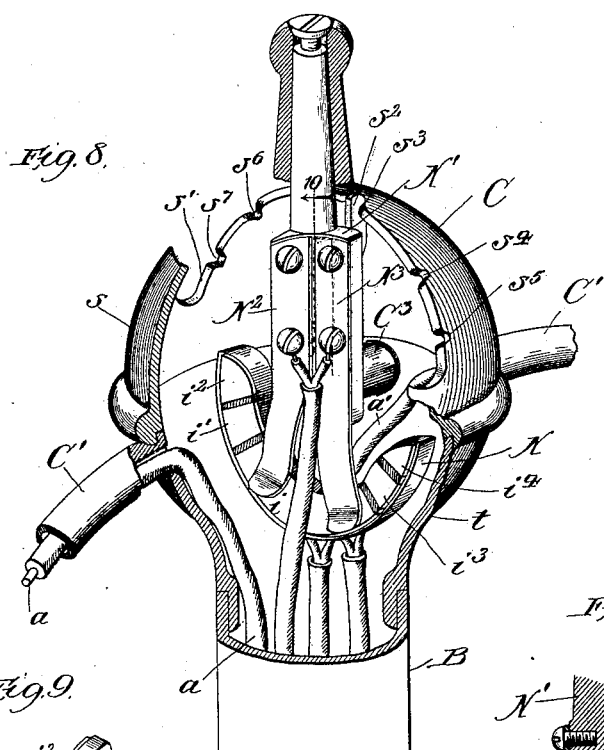
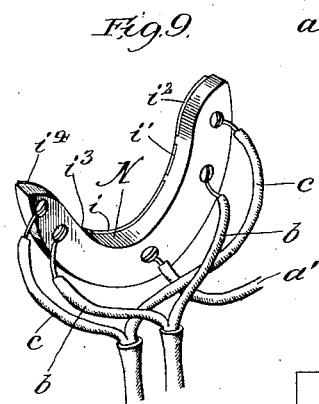
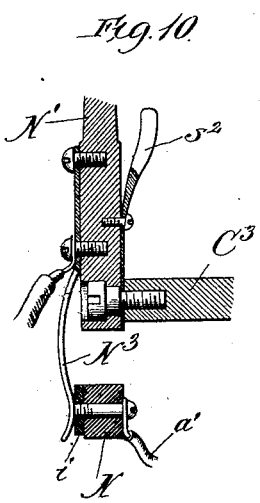
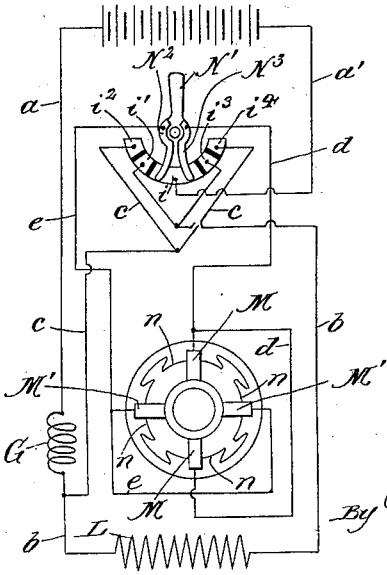
Witnesses:
Inventor:
Tracy B. Hatch,
By Dyrenforth & Dyrenforth
Attys.
THE NORRIS PETERS CO., PHOTO-LITHO., WASHINGTON, D. C.

UNITED STATES PATENT OFFICE.

TRACY B. HATCH, OF CHICAGO, ILLINOIS, ASSIGNOR, BY DIRECT AND MESNE ASSIGNMENTS, TO THE SUBMERGED ELECTRIC MOTOR COMPANY, OF MENOMONIE, WISCONSIN.

PROPELLING MECHANISM FOR BOATS.

SPECIFICATION forming part of Letters Patent No. 650,558, dated May 29, 1900.

Application filed May 18, 1899. Serial No. 717,248. (No model.)

*To all whom it may concern:*

Be it known that I, TRACY B. HATCH, a citizen of the United States, residing at Chicago, in the county of Cook and State of Illinois, have invented a new and useful Improvement in Electric Propelling Mechanism for Boats, of which the following is a specification.

My invention in its broad sense relates to improvements in electric motors operating beneath the surface of and in contact with water or other liquid.

My object is to provide an electric motor to be supported entirely or partially beneath the surface of the liquid and of a novel construction which prevents undue heating of the motor or of the resistance-coil, if employed, and dispenses with the necessity of a stuffing-box for the motor-shaft.

My object is, further, to provide a boat-propelling electric motor having the aforesaid characteristics and of an improved construction which renders the device compact, durable, and well adapted for its purpose.

Referring to the drawings, Figure 1 is a broken perspective view showing my improvements provided with a propeller and applied to the stern of a boat; Fig. 2, an enlarged broken perspective view of an attaching and supporting bracket for a tube which carries the motor and propeller-screw; Figs. 3 and 4, sections of the same, taken, respectively, on line 3 of Fig. 4 and line 4 of Fig. 3; Fig. 5, an enlarged broken central vertical section of the motor, motor-casing, and propeller-screw; Fig. 6, a view, partly broken, partly in elevation, and partly in section, showing the motor-armature, commutator, and armature-shaft, and a water-resisting armature-covering as I prefer to provide it; Fig. 7, an enlarged broken cross-section of the circumferential portion of the armature; Fig. 8, an enlarged perspective view, partly broken and partly sectional, of a steering-head and switch; Fig. 9, a perspective view of the rear side of the switch plate or segment shown in Fig. 8; Fig. 10, a broken section taken on line 10 of Fig. 8; and Fig. 11, a diagram of the electric circuits, switch, motor, &c., as employed in the construction shown.

A is the stern of a boat; B, a tube which carries the propeller-screw and electric motor; C, the steering-head and switch-casing provided with tiller-arms $C'$; D, the motor-casing; E, the propeller-screw, and F the supporting-bracket for the tube B.

The shell or casing C, for convenience of construction and to render its interior accessible, is formed, preferably, in two separable parts, the lower part $t$ being rigidly secured to the tube B and the upper part $s$ being a removable cap suitably fastened to the part $t$. The shell or casing D is also, by preference, formed in two parts $r$ and $q$, removably fastened together, as by the screws $r'$. The part $r$ forms a cap, and the part $q$ is rigidly fastened to the lower end of the tube B. The bracket F is formed with an attaching-plate $p$, which is screwed or otherwise fastened to the stern of the boat, and provided with arms $p'$ $p^2$. On the tube B is an expansible ring or collar $p^3$, which may be tightened, by means of a thumb-screw $p^4$, rigidly to the tube. The collar $p^3$ rests upon a sleeve $p^5$, which may be expanded and contracted by means of a thumb-screw $p^6$ and is provided at its upper end with a flange $p^7$, fitting loosely in a socket formed by the collar $p^3$. At the lower end of the sleeve-piece $p^5$ is an arm $p^7$, carrying a bifurcated socket-head $p^8$, which embraces the arm $p'$ and fits over a pin $p^9$, carried by said arm. Toward the upper end of the sleeve $p^5$ and carried thereby is a bifurcated arm $p^{10}$, which rests upon the arm $p^2$ and has an elongated slot $p^{11}$ to straddle a tightening-screw $p^{12}$, carried by the arm $p^2$. The tube B and parts carried thereby are placed in position by causing the socket-head $p^8$ to engage the bracket-arm $p'$, as shown, and the arm $p^{10}$ to engage the arm $p^2$. The pin $p^9$ forms a pivot whereby the tube B may be adjusted to a limited extent with relation to the bracket F to cause the tube to extend vertically, and when adjusted the parts are fastened together by means of the tightening-screw $p^{12}$. The collar $p^3$ is tightened rigidly to the tube B and rests loosely upon the sleeve $p^5$, which surrounds the tube B more or less loosely, the tension desired being obtained by adjustment of the screw $p^6$. Thus it will be understood that the collar $p^3$ supports the tube B and rests loosely upon the sleeve $p^5$, whereby the tube B and collar $p^3$ may be turned axially with relation to the sleeve.

Suitably fastened in the casing D to be stationary therein are the field-magnets G of the electric motor, which in the present construction are provided with four pole-pieces $n$, as indicated in the diagram Fig. 11. The armature H is upon a shaft H′, rotating at one end in a bearing $r^2$ in the cap $r$. Toward its opposite end the armature-shaft H is journaled in a bearing I, which is formed, preferably, integral with a cylinder I′. The cylinder I′, if provided, extends over the armature, as shown in Fig. 5, to be out of contact therewith, and fits within the pole-pieces $n$. The parts I I′ may be of brass or other non-magnetic metal, and the cylinder portion is provided with a smooth, preferably polished, inner surface $m$. The cylinder terminates in an inwardly-projecting flange $m'$, which surrounds the commutator K, being out of contact therewith. The engagement of the cylinder portion I′ with the pole-pieces holds the bearing I against rotation. In the end portion of the bearing I is an annular recess $m^2$, and a screw-plug piece $m^3$ fits and surrounds the said annular recess $m^2$ and is screwed into an opening $q'$ in the shell D. Beyond the bearing I the shaft H′ is provided with a keyway $l$ and a thread $l'$. The propeller-screw E has a hub portion E′, which may be of the construction shown, and fits the shaft H′, being keyed against rotation at the keyway $l$. On the end of the shaft H′ is a jam-nut $l^2$, which bears against the hub E′ and holds the propeller-screw in place. On the bearing I and surrounding the same is a resistance-coil L. On the shaft H′, at the side of the commutator K, is a bearing-collar $l^3$, and surrounding the bearing $r^2$ is a ball-race $r^3$, against which the collar $l^3$ rotates, so that the ball-race takes up the thrust in the rotation of the propeller-screw.

It has always been a matter of difficulty hitherto to prevent undue heating of the motor and particularly of the resistance-coil. In the present construction there are no stuffing-boxes for the armature-shaft, and as a consequence the shell D fills with water, so that the armature, field, and resistance-coil are surrounded by water and subject to the cooling influence thereof. In order that the parts may resist the corrosive and other deteriorating actions of the water, I cover the armature and field windings and resistance-coil with a waterproof cement or insulating material. The material employed may be paraffin. As I prefer to provide the armature H, which is of the "tunnel" type, I immerse it in a bath of hot paraffin to expel all air and apply a paraffin coating $k$ thereto, as shown in Fig. 6. The paraffin fills the tunnel-slots $H^2$. When the coating has dried, it may be turned down in a lathe to the shape shown in Fig. 6, and, if desired, an outer coat of hard dense wax may be applied thereto. The circumferentially-exposed surfaces $H^3$ of the body portion of the armature may be given a thin coating of hard wax, though I prefer to cover it with a coating of paraffin-oil. The resistance-coil L may, if desired, be completely embedded in paraffin $k$, and preferably the radially-extending spaces L′ between the wires are left open, so that water may enter the same and keep the wires cool. I have found in practice that in a motor of this construction revolving in water the leak of the electric current may be very small as compared with the energy passing through, and the resultant loss of energy through leakage is less than would be the loss of energy through friction were water-tight stuffing-boxes employed. In addition to this the construction possesses the great advantage of keeping the motor and resistance-coil cool to prevent the dangers attendant upon overheating and also keeps the bearings well lubricated.

The brushes M M′ may be of the end-on construction, as indicated, and are four in number. The insulated battery-wires $a$ $a'$ are wrapped in the tiller-ropes $C^2$ and extend along grooves in the under sides of the tiller-arms to the head or casing C. In the casing C and suitably fastened in place to be rigid with the part $t$ is a switch plate or segment N, of insulating material, provided on one side with contacts $i$ $i'$ $i^2$ $i^3$ $i^4$. N′ is a switch-handle pivotally mounted upon a support $C^3$ in the casing C and extending upward through a slot or segmental opening $s'$ in the part $s$. On the switch-handle is a spring-catch $s^2$, which slides against one edge of the slot $s'$, to engage notches $s^3$ $s^4$ $s^5$ $s^6$ $s^7$, which engagement tends to hold the switch-handle with necessary firmness in any one of its adjusted positions. Carried by the handle N′ are spring contact-fingers $N^2$ $N^3$, which slide upon the switch-contacts. The contact $i$ is of comparatively-large extent, so that when the handle is turned to the notch $s^3$ the fingers $N^2$ $N^3$ will both press upon the same. When the handle is turned to the notch $s^4$, the finger $N^2$ will engage the contact $i'$ and the finger $N^3$ the contact $i$. When the switch-handle is turned to the notch $s^5$, the fingers will straddle the contact $i'$ and bear, respectively, against the contacts $i^2$ and $i$. When the handle is turned to the notch $s^6$, the finger $N^3$ will engage the contact $i^3$ and the finger $N^2$ the contact $i$, and when the handle is turned to the notch $s^7$ the fingers will straddle the contact $i^3$ and bear, respectively, against the contacts $i$ and $i^4$.

The battery-wire $a$ extends to the field G, and the battery-wire $a'$ extends to the contact $i$ of the switch-plate. A wire $b$ extends from the field through the resistance L to the contacts $i'$ $i^3$ of the switch-plate. A wire or conductor $c$ extends from the field G between it and the resistance to the contacts $i^2$ $i^4$ of the switch-plate. A wire or conductor $d$ extends from the switch-finger $N^3$ to the brushes M M, and a wire or conductor $e$ extends from the switch-finger $N^2$ to the brushes $M'$.

When the switch-handle is turned to the central position at the notch $s^3$, the circuit is broken and the motor will remain at rest. Turning the handle to the notch $s^4$ causes the finger $N^2$ to bear upon the contact $i'$, whereby the current from the battery or generator $X$ will pass through the field $G$, wire $b$, resistance $L$, and wire $b$ to the contact $i'$, thence through the finger $N^2$, wire $e$, and brushes $M'$, thence through the brushes $M$, through the wire $d$, through the finger $N^3$ to the contact $i$, and thence through the battery-wire $a'$. This closes the circuit through the resistance $L$ and causes the motor to be revolved at slow speed. Turning the handle to the notch $s^5$ directs the current through the wire $a$, field $G$, and wire $c$ to the contact $i^2$, thence through the finger $N^2$, wire $e$, through the brushes $M'$, armature, brushes $M$, and wire $d$ to the finger $N^3$, contact $i$, and battery-wire $a'$. This cuts out the resistance and causes the motor to be revolved at full speed. Turning the handle from the notch $s^3$ to the notch $s^6$ reverses the motor, with the current passing through the resistance to the brushes $M'$, while turning the handle to the notch $s^7$ causes the motor to run in the reverse direction at full speed, with the resistance cut out, all as indicated in the diagram Fig. 11.

While I have shown and described a motor provided with a reversing-switch whereby the propeller-screw may be revolved to propel the boat either forward or backward, the reversal of movement of the boat may be effected by turning the tube $B$ axially until the propeller-screw extends between the tube $B$ and the stern of the boat. To permit this, the bracket-support for the tube $B$ is of sufficient length to cause the propeller-plates to clear the stern end of the keel. Thus the motion of the boat may be reversed either by reversing the motor or turning the tube $B$, as described, and, if desired, a motor may be provided without means for its reversal. By depending upon the turning of the tube $B$ to effect the reversal of direction, as well as the steering of the boat, the propeller-screw may rotate in one direction, and the thrust will always be against the ball-bearing $r^3$.

In the rotation of the armature in the water contained in the shell $D$ a whirling current of the water is set up between the armature and cylinder $I'$. As before stated, the inner surface of the cylinder is preferably smooth and polished, so that the body of water may move around with the armature and with the least degree of friction against the surface of the cylinder. The flange $m'$ is also smooth and preferably polished on the inner side and tends to confine the body of water that is in the space between the armature and field. If desired, openings $h$ may be provided in the casing $D$, so that the interior of the latter may be more freely open to the access and escape of water. On the switch-handle $N'$, I prefer to provide a guard-plate $g$, which in the movement of the switch-handle slides upon the casing $C$ over the slot $s'$ to in a measure exclude dust and prevent water which may splash against the steering-head from freely entering the casing and wetting the switch-plates.

While I prefer to support the motor entirely below the surface of the water, it may, if desired, be but partially submerged and still be subject to the cooling influence of the water.

The gist of my invention lies more especially in providing an electric motor to operate below the surface of a liquid and having all its essential elements submerged in and exposed to the liquid, whereby the liquid is admitted to surround and prevent overheating or flashing at any part of the motor and the friction incident to the employment of a liquid-excluding bearing for the motor-shaft is avoided. To prevent the liquid from corroding or otherwise injuring the windings and to diminish friction between the liquid and motor parts exposed thereto, I prefer to incase the windings in liquid-proof insulating material presenting smooth surfaces.

I have shown the motor and switch construction that I prefer to employ; but my invention is not to be limited thereto. Furthermore, my improvements may be variously modified in the matter of details of construction without departing from the spirit of my invention as defined by the claims.

What I claim as new, and desire to secure by Letters Patent, is—

1. An electric motor having all its parts submerged in and exposed to a liquid, and means for supporting the motor in its submerged position, substantially as and for the purpose set forth.

2. The combination of a support mounted to extend below the surface of a liquid, a submerged electric motor on the support and a motor-shaft extending through a liquid-admitting bearing, whereby the liquid is admitted to surround and prevent overheating of the motor, and the friction upon the shaft of a liquid-excluding bearing is avoided, substantially as described.

3. The combination of a support mounted to extend below the surface of a liquid, a submerged electric motor on the support, liquid-proof insulating material incasing the motor-windings, and a motor-shaft extending through a liquid-admitting bearing, whereby the liquid is admitted to surround and prevent overheating of the motor, and the friction upon the shaft of a liquid-excluding bearing is avoided, substantially as described.

4. In a boat-propelling device, a support mounted to extend below the surface of the water, a submerged propeller-driving electric motor on the support and a propeller-carrying motor-shaft extending through a water-admitting bearing on the support, whereby water is admitted to the motor to cool the parts thereof, and the friction upon the shaft of a water-excluding bearing is avoided, substantially as and for the purpose set forth.

5. In a boat-propelling device, a propeller-driving electric motor supported to extend below the surface of the water, and open to the access of the water between the armature and field and a cylinder surrounding the armature within the pole-pieces of the field, substantially as and for the purpose set forth.

6. In a boat-propelling device, a propeller-driving electric motor supported to extend below the surface of the water, and open to the access of the water between the armature and field, and a cylinder surrounding the armature within the pole-pieces of the field having a smooth inner surface, substantially as and for the purpose set forth.

7. In a boat-propelling device, a propeller-driving electric motor supported to extend below the surface of the water, and open to the access of the water between the armature and field, and a cylinder surrounding the armature within the pole-pieces of the field, having a smooth inner surface, and provided with an annular inwardly-projecting flange, substantially as and for the purpose set forth.

8. In a boat-propelling device, a propeller-driving electric motor and resistance supported to extend below the surface of the water, and open to the access of the water between the armature and field and about the resistance, commutator and brushes, substantially as and for the purpose set forth.

9. In a boat-propelling device, a propeller-driving electric motor and resistance supported to extend below the surface of the water, and open to the access of the water between the armature and field and about the resistance, and waterproof insulating material incasing the resistance, substantially as and for purpose set forth.

10. In a boat-propelling device, a support, an electric motor and resistance on the support extending below the surface of the water and open to the access of the water about the resistance and between the armature and field, waterproof insulating material incasing the resistance and motor-windings, an armature-shaft journaled in the support, and a propeller-screw on said shaft, substantially as and for the purpose set forth.

11. In a boat-propelling device, the combination of an axially-movable supporting-tube, a hollow steering-head on said tube, a propeller-driving electric motor and propeller-screw on the lower end of said tube, an electric-current supplier, conductors extending from the said supplier through the steering-head and supporting-tube to the motor, an electric switch in the steering-head in circuit with the said supplier and motor, and an operating-handle for said switch projecting through the steering-head, substantially as described.

12. In a boat-propelling device, the combination of an axially-movable supporting-tube, a hollow steering-head on said tube, a propeller-driving electric motor, resistance therefor and propeller-screw on the lower end of said tube, an electric-current supplier, conductors extending from the said supplier through the steering-head and supporting-tube to the motor and resistance, an electric switch in the steering-head in circuit with the said supplier, motor and resistance, and an operating-handle for said switch projecting through the steering-head, substantially as described.

TRACY B. HATCH.

In presence of—
P. T. SPENCER,
D. W. LEE.